US009266301B2

(12) United States Patent
Furman et al.

(10) Patent No.: US 9,266,301 B2
(45) Date of Patent: *Feb. 23, 2016

(54) METHOD TO ADHERE AND DISLODGE CREPE PAPER

(71) Applicant: NALCO COMPANY, Naperville, IL (US)

(72) Inventors: Gary S. Furman, St. Charles, IL (US); Mingli Wei, Naperville, IL (US); Winston Su, Woodridge, IL (US); Christopher D. Kaley, Naperville, IL (US); David J. Castro, DeKalb, IL (US); Vladimir Grigoriev, Atlanta, GA (US)

(73) Assignee: NALCO COMPANY, Naperville, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/656,793

(22) Filed: Oct. 22, 2012

(65) Prior Publication Data
US 2014/0110071 A1 Apr. 24, 2014

Related U.S. Application Data

(63) Continuation-in-part of application No. 11/172,079, filed on Jun. 30, 2005, now Pat. No. 8,293,073.

(51) Int. Cl.
B31F 1/14 (2006.01)
C09J 9/00 (2006.01)
C09J 139/02 (2006.01)
C08L 77/00 (2006.01)
C08L 79/02 (2006.01)

(52) U.S. Cl.
CPC ... B31F 1/14 (2013.01); C09J 9/00 (2013.01); C09J 139/02 (2013.01); C08L 77/00 (2013.01); C08L 79/02 (2013.01)

(58) Field of Classification Search
CPC ..... D21H 21/146; D21H 21/30; D21H 17/55; D21H 17/56; D21H 25/005; B31F 1/12; B31F 1/14; C09J 139/02
USPC .......... 162/111–113, 158, 162, 164.1, 164.3, 162/168.1, 168.2, 198; 156/183; 264/282–283
See application file for complete search history.

(56) References Cited

U.S. PATENT DOCUMENTS

| 2,182,306 | A | 12/1939 | Ulrich et al. | |
| 3,251,778 | A | 5/1966 | Stirling | |
| 3,301,746 | A | 1/1967 | Sanford et al. | |
| 3,640,841 | A | 2/1972 | Winslow et al. | |
| 3,905,863 | A | 9/1975 | Ayers | |
| 3,994,771 | A | 11/1976 | Morgan, Jr. et al. | |
| 4,102,737 | A | 7/1978 | Morton | |
| 4,529,480 | A | 7/1985 | Trokhan | |
| 5,048,589 | A | 9/1991 | Cook et al. | |
| 5,232,553 | A | 8/1993 | Smigo et al. | |
| 5,281,307 | A | 1/1994 | Smigo et al. | |
| 5,374,334 | A | 12/1994 | Sommese et al. | |
| 5,382,323 | A * | 1/1995 | Furman et al. | 162/111 |
| 5,660,687 | A | 8/1997 | Allen et al. | |
| 5,994,449 | A | 11/1999 | Maslanka | |
| 6,207,011 | B1 | 3/2001 | Luu et al. | |
| 6,312,644 | B1 * | 11/2001 | Moriarty et al. | 422/14 |
| 6,426,383 | B1 | 7/2002 | Fong et al. | |
| 6,645,428 | B1 * | 11/2003 | Morris et al. | 422/15 |
| 6,663,942 | B1 | 12/2003 | Luu et al. | |
| 6,894,110 | B2 | 5/2005 | Fong et al. | |
| 7,048,826 | B2 * | 5/2006 | Archer et al. | 162/111 |
| 7,875,720 | B2 * | 1/2011 | Morris et al. | 546/79 |
| 7,902,312 | B2 | 3/2011 | Gu et al. | |
| 8,066,847 | B2 * | 11/2011 | Grigoriev et al. | 162/111 |
| 8,084,525 | B2 * | 12/2011 | Grigoriev et al. | 524/145 |
| 8,101,045 | B2 * | 1/2012 | Furman et al. | 162/112 |
| 8,293,073 | B2 * | 10/2012 | Grigoriev et al. | 162/112 |
| 8,444,812 | B2 * | 5/2013 | Grigoriev et al. | 162/112 |
| 2004/0060675 | A1 * | 4/2004 | Archer et al. | 162/111 |
| 2004/0135124 | A1 * | 7/2004 | Morris et al. | 252/408.1 |
| 2004/0177940 | A1 * | 9/2004 | Archer et al. | 162/199 |
| 2005/0006040 | A1 | 1/2005 | Boettcher et al. | |
| 2005/0020729 | A1 * | 1/2005 | Renz et al. | 523/160 |
| 2005/0028954 | A1 | 2/2005 | Neal et al. | |
| 2005/0245669 | A1 | 11/2005 | Clungeon et al. | |
| 2007/0000631 | A1 * | 1/2007 | Grigoriev et al. | 162/111 |
| 2007/0151684 | A1 * | 7/2007 | Grigoriev et al. | 162/111 |
| 2009/0145565 | A1 * | 6/2009 | Esser et al. | 162/111 |
| 2010/0122785 | A1 * | 5/2010 | Grigoriev et al. | 162/111 |
| 2011/0162811 | A1 * | 7/2011 | Furman et al. | 162/111 |
| 2013/0233804 | A1 * | 9/2013 | Xie et al. | 210/709 |
| 2013/0245158 | A1 * | 9/2013 | Grigoriev et al. | 523/400 |
| 2014/0069600 | A1 * | 3/2014 | Furman et al. | 162/164.6 |
| 2014/0110071 | A1 * | 4/2014 | Furman et al. | 162/111 |

FOREIGN PATENT DOCUMENTS

| CA | 2495272 A1 * | 4/2004 |
| EP | 0942008 A1 | 9/1999 |
| EP | 1939352 A1 * | 7/2008 |
| JP | 06-212596 A | 8/1994 |
| JP | 06-235191 A | 8/1994 |
| KR | 10-2010-0052498 A | 5/2010 |
| WO | WO 2004031475 A2 * | 4/2004 |

(Continued)

Primary Examiner — Jose Fortuna
(74) Attorney, Agent, or Firm — Benjamin Carlsen

(57) ABSTRACT

This invention is method of creping a paper web comprising a) applying to a rotating creping cylinder an adhesive composition having a pH of about 6.5 to about 8 and comprising one or more vinylamine/N-vinyl formamide polymers composed of about 10 to about 99 mole percent vinylamine monomer and about 90 to about 1 mole percent N-vinylformamide monomer; b) pressing the paper web against the creping cylinder to effect adhesion of the paper web to the creping cylinder; and c) dislodging the paper web from the creping cylinder with a doctor blade.

12 Claims, No Drawings

(56) References Cited

FOREIGN PATENT DOCUMENTS

| WO | 2006048131 | A1 | | 5/2006 |
| WO | 2007005577 | A2 | | 1/2007 |
| WO | WO 2007005577 | A2 | * | 1/2007 |
| WO | WO 2008067243 | A1 | * | 6/2008 |
| WO | WO 2009017781 | A2 | | 2/2009 |
| WO | WO 2009017781 | A3 | | 3/2009 |
| WO | WO 2014066176 | A1 | * | 5/2014 |

* cited by examiner

METHOD TO ADHERE AND DISLODGE CREPE PAPER

CROSS-REFERENCE TO RELATED APPLICATIONS

This application is a continuation in part of U.S. patent application Ser. No .11/172,079 filed on Jun. 30, 2005 which issued as U.S. Pat. No. 8,293,073, on Oct. 23,2012.

STATEMENT REGARDING FEDERALLY SPONSORED RESEARCH OR DEVELOPMENT

Not Applicable.

BACKGROUND OF THE INVENTION

This invention relates generally to a method of creping paper products in which a paper web is adhered to a creping cylinder using poly(vinylamine/vinylformamide) compositions having a pH of about 6.5 to about 8. The desired properties of tissue, including softness, bulk, stretch and absorbency, are typically achieved by the means of a steam-heated Yankee dryer cylinder and a doctor blade. A wet fiber web is largely dewatered at the pressure roll nip. At this point, the sheet is transferred to the Yankee surface and has a consistency of about 35-90%. The sheet is further dried on the hot Yankee cylinder to a typical consistency of 90-98% and removed with a doctor blade. The mechanical action of the blade results in a disruption of the fiber-fiber bonds and a formation of a microfold structure within the sheet. This process is referred to as creping.

In order to develop the crepe, the paper web has to adhere to the surface of the Yankee dryer. The adhesion is provided by applying an adhesive to the dryer. Most common Yankee adhesives are synthetic polymers such as polyaminoamides, polyamides, polyamines, polyvinyl alcohols, polyvinyl acetates, polyacrylamides and polyethers. Various low molecular weight compounds are used to modify the Yankee coating properties. Some examples of compositions of matter, apparatuses, and methods useful with creping paper are described in U.S. Pat. Nos. 5,374,334, 5,994,449, 6,663,942, 5,660,687, 6,207,011, International Patent Applications 2006/048131 A1 and 20071005577 A2, and US Published Patent Applications 2005/0028954, 200510245669, and 200510006040.

A superior Yankee coating should form a film that provides good adhesion for efficient creping, and is also uniform, durable and soft. Uniformity of the coating is critical not only for consistent creping that affects the quality of the produced sheet, but also for even coverage of the Yankee surface to prevent premature wear of the cylinder and the blade. Durability is a characteristic of how stable the coating is on the Yankee surface, particularly at the pressure roll nip. If the coating is easily washed off, it does not protect the Yankee cylinder and leads to excessive creping blade wear. A hard coating causes blade chatter, which results in blade wear and non-uniform creping. A soft, but durable coating is preferred.

Polyaminoamides crosslinked with epichlorohydrin (PAE) are the most widely used adhesives in commercial practice by a wide margin. Depending on the grade and creping conditions, adhesion, durability and softness of the coating can be adjusted to an appropriate level by using combinations of PAE resins having various molecular weight and/or modifiers such as release oils, surfactants, humectants, phosphates, etc. Yet, the applicability of PAE resins is not universal and they do not always work for all tissue grades and conditions. The most common problem that is faced with PAE adhesives is their tendency to build up on the Yankee dryer, sometimes referred to as "hard" coating. This results in blade chatter causing picks or holes in the sheet and resulting in sheet breaks and machine downtime. Moreover, even though the amounts of epi and epi by-products are very low in the modern PAE adhesives, the industry would prefer to use non-epi adhesives if an alternative existed. However, other non-epi alternatives including polyvinyl alcohols, polyvinyl acetates, polyacrylamides and polyethers, also have deficiencies regarding the coating properties they provide in that there is not an optimum combination of coating durability, softness, adhesion and uniformity. Accordingly, there is an ongoing need for improved creping adhesive compositions.

The art described in this section is not intended to constitute an admission that any patent, publication or other information referred to herein is "Prior Art" with respect to this invention, unless specifically designated as such. In addition, this section should not be construed to mean that a search has been made or that no other pertinent information as defined in 37 CFR §1.56(a) exists.

BRIEF SUMMARY OF THE INVENTION

At least one embodiment of the invention is directed towards a method of creping a paper web. The method comprises: a) preparing an adhesive composition having a pH of between 6.5 and 8 and comprising one or more vinylamine/ N-vinyl formamide polymers comprising about 10 to about 99 mole percent vinylamine monomer and about 90 to about 1 mole percent N-vinyl formamide monomer, then reacting the polymers with a halogenated organic acid such that the carboxyl carbon of the organic acid becomes covalently bonded to an amino nitrogen of the polymer, b) applying the adhesive composition to a to a creping cylinder, c) pressing the paper web against the creping cylinder to effect adhesion of the paper web to the creping cylinder; and d) dislodging the paper web from the creping cylinder with a doctor blade.

The paper web may be pre-dried and moved along on a TAD belt before it is pressed against the cylinder. The pH of the composition may be between 7 and 7.5. The peel force adhesion of the polymer may be at least 20% greater than that of the same polymer which has not been reacted with a halogenated acid. The composition further comprises at least one additional agent selected from the list consisting of: plasticizers, humectants, oxidative stabilizers, inorganic phosphates, organic phosphates, release agents, lubricants, corrosion control agents, and any combination thereof. The method may further comprise the steps of adding an inert fluorescent tracer to the composition and detecting florescence on the creping cylinder to determine the amount of polymer, and/or one or more additional agents which actually attach to the cylinder.

The polymer may be crosslinked with another polymer selected from the list consisting of: polyvinyl alcohol, polyvinyl acetate, vinyl alcohol bearing polymers, vinyl acetate bearing polymers, polyaminoamides, polyamides, polyamines, crosslinked polyaminoamides, polyethyleneimines, polyacrylamide, glyoxylated polyacrylamide, polyacrylates, polymethylmethacrylates, starches, carboxymthylcellulose, polyethers, vinyl amine/acrylamide copolymers, vinylamine/acrylate copolymers, polyvinylpyrrolidones, synthetic proteins, natural proteins, and any combination thereof. The cross linking may be achieved with a crosslinking agent selected from the list consisting of epihalohydrins, dialdehydes diglycidyl ethers, and any combination thereof.

The polymer may be a copolymer that also contains the substituent units of another polymer selected from the list consisting of: polyvinyl alcohol, polyvinyl acetate, vinyl alcohol bearing polymers, vinyl acetate bearing polymers, polyaminoamides, polyamides, polyamines, crosslinked polyaminoamides, polyethyleneimines, polyacrylamide, glyoxylated polyacrylamide, polyacrylates, polymethylmethacrylates, starches, carboxymthylcellulose, polyethers, vinyl amine/acrylamide copolymers, vinylamine/acrylate copolymers, polyvinylpyrrolidones, synthetic proteins, natural proteins, and any combination thereof.

The composition may comprise a blend of two or more vinylamine/N-vinyl formamide polymers, at least one of the polymers being a low molecular weight polymer and at least one of the polymers being a high molecular weight polymer or may comprise a blend of two or more vinylamine/N-vinyl formamide polymers, at least one of the polymers having an $M_W$ of 2,000 to 2,000,000 and at least one of the polymers having an $M_W$ of 1,000 to 200,000.

Prior to applying the adhesive composition to a creping cylinder the method may comprise the following additional steps: i) contacting the polymer with polyvinyl alcohol under STP conditions, and ii) maintaining the polyvinyl alcohol and polymer at a temperature of between 90-95° C. until the polyvinyl alcohol is completely dissolved into a solution, At least one embodiment of the invention is directed towards preparing an adhesive composition having a pH of between 6.5 and 8 and comprising one polymers, the constituent units of the polymer having a structure of:

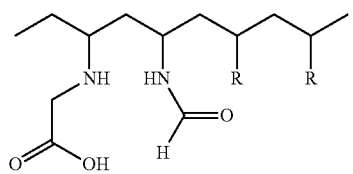

wherein the polymer excludes reaction products of a Michael addition, applying the adhesive composition to a creping cylinder, pressing the paper web against the creping cylinder to effect adhesion of the paper web to the creping cylinder; and dislodging the paper web from the creping cylinder with a doctor blade.

At least one embodiment of the invention is directed towards a method of preparing a composition of matter, the method comprising the steps of: providing dry polyvinyl alcohol, providing an aqueous vinylamine/N-vinyl formamide polymer, contacting the polyvinyl alcohol with the polymer under STP conditions or at a temperature of less than 80° C., maintaining the polyvinyl alcohol and polymer at a temperature of between 90-95° C. until the polyvinyl alcohol is completely dissolved into a solution, and allowing the solution to cool to below 80° C. The method may further comprise the step of adding, after the solution has cooled at least one item selected from the list consisting of: water-soluble polyols, modifiers, polyglycerol, preservatives, functional additives, water, and any combination thereof.

DETAILED DESCRIPTION OF THE INVENTION

The following definitions are provided to determine how terms used in this application, and in particular how the claims, are to be construed. The organization of the definitions is for convenience only and is not intended to limit any of the definitions to any particular category.

"Bulk" means the inverse of the density of a tissue paper web and is commonly expressed in units of $cm^3/g$. It is another important part of real and perceived performance of tissue paper webs. Enhancements in bulk generally add to the clothlike, absorbent perception. A portion of the bulk of a tissue paper web is imparted by creping.

"Copolymerized" means formed into a distinct polymer chain having at least two distinct kinds of substituent units and includes but is not limited to alternating copolymers, periodic copolymers, statistical copolymers, random copolymers, block copolymers, terpolymers, stereoblock copolymers, and graft copolymers.

"Crosslinked" means at least one distinct polymer chain of substituent units which is chemically attached to another distinct polymer chain of substituent units.

"Crepe Structure" means the folds and seams present on a paper product that has undergone a creping process.

"Doctor blade" means a blade that is disposed adjacent to another piece of equipment such that the doctor blade can help remove from that piece of equipment a material that is disposed thereon. Doctor blades are commonly used in many different industries for many different purposes, such as, for example, their use to help remove material from a piece of equipment during a process. Examples of materials include, but are not limited to, tissue webs, paper webs, glue, residual buildup, pitch, and combinations thereof. Examples of equipment include, but are not limited to, drums, plates, Yankee dryers, and rolls. Doctor blades are commonly used in papermaking, nonwovens manufacture, the tobacco industry, and in printing, coating and adhesives processes. In certain instances, doctor blades are referred to by names that reflect at least one of the purposes for which the blade is being used.

"Fiber" means an elongate particulate having an apparent length greatly exceeding its apparent width. More specifically, and as used herein, fiber refers to such fibers suitable for a papermaking process.

"High molecular weight polymer" means a polymer with a weight average molecular weight of above 200,000.

"Humectant" means a substance having affinity for water with stabilizing action on the water content of a material, a humectant keeps the moisture content caused by humidity fluctuations within a narrow range, humectants include but are not limited to low molecular weight water soluble polyols such as polyethylene glycol, propylene glycol, ethylene glycol, diethylene glycol, triethylene glycol, dipropylene glycol, glycerol, and polyglycerol such as those described in U.S. Pat. No. 8,101,045.

"Low molecular weight polymer" means a polymer with a weight average molecular weight of from about 1000 to about 200,000.

"Modified by Reaction" means being so effected by a chemical reaction that two or more items become covalently bonded to each other.

"Paper Product or Paper Sheet" means any formed fibrous structure end product of a papermaking process traditionally, but not necessarily, comprising cellulose fibers. Examples of such end products include but are not limited to facial tissue, bath tissue, table napkins, copy paper, printer paper, writing paper, notebook paper, newspaper, paper board, poster paper, bond paper, cardboard, and the like.

"Papermaking Process" means one or more processes for converting raw materials into paper products and which includes but is not limited one or more of such steps as pulping, digesting, refining, drying, calandering, pressing, creping, dewatering, and bleaching.

"Polyalkylene polyamine" is organic compounds having two primary amine (—$NH_2$) groups and at least one secondary amine group where the amino nitrogen atoms are linked together by alkylene groups, provided no two nitrogen atoms are attached to the same carbon atoms. Polyalkylene polyamines include diethylenetriamine (DETA), triethylenetetraamine (TETA), tetraethylenepentaamine (TEPA), dipropylenetriamine, and the like.

"Plasticizer" means a substance which when added to a material causes an increase in the flexibility and workability of that material, often as a result of lowering the glass transition temperature of that material.

"PVA" means poly(vinylamine/vinylformamide).

"PVOH" means polyvinyl alcohol.

"Release Aid" means a composition of matter, which reduces the adhesive properties of another composition it comes into contact with, it often includes a surfactant and can be oil based or non-oil based.

"Sheet control" as used herein, refers to the lack of vibrations, turbulence, edge flipping, flutter, or weaving of the web that result in a loss of control at higher speeds.

"Softness" means the tactile sensation perceived by the consumer as he/she holds a particular product, rubs it across his/her skin, or crumples it within his/her hand. This tactile sensation is provided by a combination of several physical properties. One of the most important physical properties related to softness is generally considered by those skilled in the art to be the stiffness of the paper web from which the product is made. Stiffness, in turn, is usually considered to be directly dependent on the strength of the web.

"Strength" means the ability of the product, and its constituent webs, to maintain physical integrity and to resist tearing, bursting, and shredding under use conditions.

"STP" means standard temperature and pressure, it approximates the freezing temperature of water and atmospheric pressure at sea level, STP is 0° C. (32° F. or 273 Kelvin) and 1 atm (101.335 kPa, 14.7 PSI, 760 mmHg, 760 Torr, or otherwise referred to as 1 Bar for pressure gauge labeling).

"Tissue paper web, paper web, web, paper sheet, sheet and paper product" all mean sheets of paper made by a process comprising the steps of forming an aqueous papermaking furnish; depositing this furnish onto a foraminous surface, such as a Fourdrinier wire, and removing the water from the furnish either by gravity, by vacuum assisted drainage or by evaporative means (eg. TAD). In the final step of the process, the desirable textural characteristics are imparted to the paper by a creping process comprising: a) applying an adhesive composition to the surface of a creping cylinder; b) adhering a cellulosic web to the creping cylinder and; c) dislodging the adhered web from the creping cylinder with a doctor blade. The tissue web can be comprised of various types of natural and synthetic fibers including wood pulps of chemical and mechanical types, vegetable fibers, recycled fibers and synthetic fibers such as polypropylene. The tissue web can also be comprised of particulate fillers, such as kaolin clay, titanium dioxide, and/or calcium carbonate.

"TAD" means through air-drying process, a process in which a molded paper sheet is carried along with a fabric or other material belt through which hot air can pass to effect drying. This process allows the sheet to be dried while preserving its bulk and softness.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the *Kirk-Othmer Encyclopedia of Chemical Technology*, 5th Edition, (2005), (Published by Wiley, John & Sons, Inc.) this definition shall control how the term is to be defined in the claims.

At least one embodiment of the invention is directed to a method of creping paper products in which a paper web is adhered to a creping cylinder using a composition comprising poly(vinylamine/vinylformamide). In at least one embodiment the composition has a pH of about 6.5 to about 8.

In at least one embodiment, prior to being applied to the creping cylinder, the web is pre-dried on a TAD belt to further enhance the bulk and softness of the tissue paper. TAD systems are described in U.S. Pat. Nos. 3,994,771, 4,102,737, 4,529,480, 5,048,589, 3,301,746, and 3,905,863. Because the TAD pre-dries the web, the composition is even more effective. The methods and compositions described in this invention can be used to increase adhesion of the tissue sheet to the Yankee in the TAD process. The lower moisture content of the TAD pre-dried sheet and higher temperatures of the Yankee surface create more difficult conditions for the Yankee adhesive to function well. These hot, dry conditions can lead to a loss in adhesive properties. As a result prior art compositions are ineffective when used in such conditions. However the compositions of this invention show improved performance under these difficult conditions.

In at least one embodiment the Vinylamine/N-vinyl formamide polymers are prepared by polymerization of N-vinylformamide under free radical forming conditions followed by acid or base hydrolysis of a portion of the amide groups to amine groups. By controlling the stoichiometry of the hydrolyzing agent, it is possible to prepare vinylamine/N-vinyl formamide polymers containing the desired vinylamine/vinylformamide ratio. In at least one embodiment the preparation of vinylamine/N-vinyl formamide polymers is according to the method described in U.S. Pat. No. 5,374,334 and references cited therein. At least one manlier of preparing stable dispersions of vinylamine/N-vinyl formamide polymers in aqueous salt solution is described in U.S. Pat. Nos. 6,426,383 and 6,894,110. Vinylamine/N-vinylformamide polymers are also commercially available from BASF, Mount Olive, N.J. under the tradename Lupamin.

The pH of the vinylamine/N-vinyl formamide polymers can be adjusted to the desired range of 6.5-8 by addition of acid. Representative acids include sulfuric, hydrochloric, phosphoric, formic, acetic, and the like. In an embodiment, the acid is selected from sulfuric acid and formic acid.

In an embodiment, the vinylamine/N-vinyl formamide polymers have a weight average molecular weight of about 100,000 to about 500,000 Daltons.

In an embodiment, the vinylamine/N-vinyl formamide polymers are composed of about 20 to about 80 mole percent vinylamine monomer and about 80 to about 20 mole percent N-vinylformamide monomer.

In an embodiment, the vinylamine/N-vinyl formamide polymer composition has a pH of about 7 to about 7.5.

In an embodiment, the vinylamine/N-vinyl formamide polymers have a weight average molecular weight of about 300,000 to about 400,000 Daltons.

In at least one embodiment this invention is a polymer composition having a pH of about 6.5 to about 8 comprising one or more vinylamine/N-vinyl formamide polymers composed of about 10 to about 99 mole percent vinylamine monomer and about 90 to about 1 mole percent N-vinylformamide monomer wherein the vinylamine/N-vinyl formamide polymers are reacted with about 1 to about 10 percent, based on polymer actives, of one or more crosslinkers wherein the crosslinkers contain at least one epoxide group and no halogens.

In at least one embodiment the composition comprises a blend of a PVA polymer with another PVA polymer and/or a polymer selected from the list consisting of: polyvinyl alcohol, polyvinyl acetate, vinyl alcohol bearing polymers, vinyl acetate bearing polymers, polyaminoamides, polyamides, polyamines, crosslinked polyaminoamides, polyethyleneimines, polyacrylamide, glyoxylated polyacrylamide, polyacrylates, polymethylmethacrylates, starches, carboxymthylcellulose, polyethers, vinyl amine/acrylamide copolymers, vinylamine/acrylate copolymers, polyvinylpyrrolidones, synthetic proteins, natural proteins, and any combination thereof. In at least one embodiment the blend comprises at least one high molecular weight polymer and one low molecular weight polymer.

In at least one embodiment the PVA polymer(s) and/or one or more of the other previously listed polymers are blended when in a dry form including but not limited to powder, solid blocks, shavings, grindings, slices, moldings, congealed matter and any combination thereof. In at least one embodiment the PVA polymer(s) and/or one or more of the other previously listed polymers are blended when in a liquid form including but not limited to a solution, dispersion, emulsion, suspension and any combination thereof. In at least one embodiment the blend comprises one or more of liquid form PVA blended with liquid form PVOH, dry form PVA blended with liquid form PVOH, liquid form PVA blended with dry form PVOH, dry form PVA blended with dry PVOH, and any combination thereof.

In at least one embodiment the composition comprises PVA polymer which is crosslinked with another polymer selected from the list consisting of: polyvinyl alcohol, polyvinyl acetate, vinyl alcohol bearing polymers, vinyl acetate bearing polymers, polyaminoamides, polyamides, polyamines, crosslinked polyaminoamides, polyethyleneimines, polyacrylamide, glyoxylated polyacrylamide, polyacrylates, polymethylmethacrylates, starches, carboxymthylcellulose, polyethers, vinyl amine/acrylamide copolymers, vinylamine/acrylate copolymers, polyvinylpyrrolidones, synthetic proteins, natural proteins, and any combination thereof.

In at least one embodiment the cross linking is achieved with a crosslinking agent selected from the list consisting of: epihalohydrins, dialdehydes diglycidyl ethers, polyethyleneglycol diglycidyl ether, trimethylolpropane triglycidyl ether, glycerol propoxylate triglycidyl ether, glycerol triglycidyl ether, N,N-diglcylidylaniline, tris(2,3-epoxypropyl) isocyanurate, and the like, and any combination thereof.

In at least one embodiment the reaction with crosslinkers is accomplished by heating an aqueous solution of the vinylamine/N-vinyl formamide polymers and the desired amount of cross-linker at a temperature of about 20° C. to about 100° C.

In at least one embodiment, the vinylamine/N-vinyl formamide polymers reacted with the crosslinkers are composed of about 30 to about 99 mole percent vinylamine monomer and about 70 to about 1 mole percent N-vinylformamide monomer.

In at least one embodiment, the vinylamine/N-vinyl formamide polymers reacted with the crosslinkers are composed of about 85 to about 95 mole percent vinylamine monomer and about 15 to about 5 mole percent N-vinylformamide monomer.

In at least one embodiment, the vinylamine/N-vinyl formamide polymers reacted with the crosslinkers have a weight average molecular weight of about 10,000 to about 100,000 Daltons.

In at least one embodiment, the vinylamine/N-vinyl formamide polymers reacted with the crosslinkers have a molecular weight of about 30,000 to about 60,000 Daltons.

In at least one embodiment, the crosslinkers are selected from polyethyleneglycol diglycidyl ether (PEGDGE) and trimethylolpropane triglycidyl ether (TMPTE).

In at least one embodiment the composition comprises PVA polymer which is a copolymer that also contains the substituent units of another polymer selected from the list consisting of: polyvinyl alcohol, polyvinyl acetate, vinyl alcohol bearing polymers, vinyl acetate bearing polymers, polyaminoamides, polyamides, polyamines, crosslinked polyaminoamides, polyethyleneimines, polyacrylamide, glyoxylated polyacrylamide, polyacrylates, polymethylmethacrylates, starches, carboxymthylcellulose, polyethers, vinyl amine/acrylamide copolymers, vinylamine/acrylate copolymers, polyvinylpyrrolidones, synthetic proteins, natural proteins, and any combination thereof.

In at least one embodiment the composition comprises an additional agent selected from the list consisting of: plasticizers, humectants, oxidative stabilizers, inorganic phosphates, organic phosphates, release agents, lubricants, corrosion control agents, and any combination thereof.

In at least one embodiment the composition comprises a fluorescent tracing agent. This allows for the determination of whether and how much of the additional agent added to the composition actually ends up on the creping cylinder. Use of the fluorescent tracing agent comprises the steps of: a) adding a known amount of an inert fluorescent tracer to a known amount of PVA and/or additional agent, b) applying the agent to a creping cylinder; c) using a fluorometer to measure the fluorescent signal of said inert fluorescent tracer on said creping cylinder; d) using the fluorescent signal of said inert fluorescent tracer to determine the amount of inert fluorescent tracer present on said creping cylinder; e) correlating the amount of inert fluorescent tracer present on said creping cylinder with the amount of PVA and/or agent on the creping cylinder; f) comparing the amount of PVA and/or agent on the creping cylinder with the desired amount of agent that is supposed to be present on said creping cylinder; and optionally g) adjusting the amount of agent present on said creping cylinder, based on the measured fluorescent signal of said inert fluorescent tracer. In at least one embodiment the fluorescent tracing agent is of the type described in and/or it is used according to the methods described in U.S. Pat. No. 7,048,826.

The meaning of the term "inert", as used herein is that an inert fluorescent tracer is not appreciably or significantly affected by any other chemistry in the creping material or metal surface of said creping cylinder. To quantify what is meant by "not appreciably or significantly affected", this statement means that an inert fluorescent compound has no more than a 10% change in its fluorescent signal, under conditions normally encountered on creping cylinders with one or more creping compositions present on the surface.

Suitable inert fluorescent tracer include, but are not limited to, 1,5-naphthalenedisulfonic acid disodium salt (1,5-NDSA), 2-amino-1-naphthalenesulfonic acid, 5-amino-2-naphthalenesulfonic acid, 4-amino-3-hydroxyl-1-naphthalenesulfonic acid, 6-amino-4-hydroxyl-2-naphthalenesulfonic acid, 7-amino-1,3-naphthalenedisulfonic acid, potassium salt, 4-amino-5-hydroxy-2,7-naphthalenedisulfonic acid, 5-dimethylamino-1-naphthalenesulfonic acid, 2,6-naphthalenedicarboxylic acid, dipotassium salt, 2-anthracenesulfonic acid, sodium salt, quinoline (CAS Registry No. 91-22-5), 1-ethylquinaldinium iodide, dibenzofuransulfonic acid, Brilliant Acid Yellow 8G (CAS Registry No. 2391-30-2, i.e. Lissamine Yellow FF, Acid Yellow 7), cresyl violet acetate (CAS Registry No. 10510-54-0), Safranine O (CAS Registry No. 477-73-6), bathophenanthrolinedisulfonic acid disodium salt (CAS Registry No. 52746-49-3), Titan Yellow (CAS Registry No. 1829-00-1, i.e. Thiazole Yellow G), Celestine Blue (CAS Registry No. 1562-90-9), Sandoz CW (CAS Registry No. 56509-06-9, i.e. Flu. Bright, 235), Sandoz CD (CAS Registry No. 16470-24-9, i.e. Flu. Bright. 220), Sandoz TH-40 (CAS Registry No. 32694-95-4), Tinopal 5BM-GX (CAS Registry No. 169762-28-1), Keyfluor White ST (CAS Registry No. 144470-48-4, i.e. Flu. Bright. 28), Phorwite CL (CAS Registry No. 12270-53-0, i.e. Flu. Bright. 191), Phorwite BKL (CAS Registry No. 61968-72-7, i.e. Flu. Bright. 200), Leucophor BSB (CAS Registry No. 68444-86-0, i.e. Leucophor AP, Flu. Bright. 230), Leucophor BMB (CAS Registry No. 16470-24-9, i.e. Leucophor U, Flu. Bright. 290), Keyfluor White CN (CAS Registry No. 16470-24-9), Tinopol DCS (CAS Registry No. 205265-33-4), 1-amino-4-naphthalene sulfonic acid, 1-amino-7-naphthalene sulfonic acid, amino 2,5-benzene disulfonic acid, 1,3,6,8-pyrenetetrasulfonic acid, tetrasodium salt, 8-hydroxy-1,3,6-pyrenetrisulfonic acid, trisodium salt (i.e. Pyranine), 3,4,9,10-perylenetetracarboxylic acid, bis-N-methylacridinium (i.e. Lucigenin), 2-(4-aminophenyl)-6-methylbenzothiazole, fluorescein (CAS Registry No. 2321-07-5, i.e. Acid Yellow 73, Uranine), Sulforhodamine B (CAS Registry No. 3520-42-1, i.e. Acid Red 52), Rhodamine WT (CAS Registry No. 37299-86-8), Resazurin (CAS Registry No. 550-82-3), Rhodalux (CAS Registry No. 550-82-3), Anthrasol Green IB (CAS Registry No. 2538-84-3, i.e. Solubilized Vat Dye), Acridine Orange (CAS Registry No. 65-61-2), Phorwite BHC 766 (CAS Registry No. 52237-03-3), Tinopal CBS-X (CAS Registry No. 27344-41-8), Tinopal RBS 200, Pylaklor White S-15A (CAS Registry No. 6416-68-8) and their ammonium, potassium and sodium salts.

The selection of which inert fluorescent tracer to use is based on matching the fluorescent tracer to the PVA or agent. The method used to select the optimum inert fluorescent tracer is to use a fluorometer to detect whatever fluorescent signals are present on a creping cylinder coated with a PVA or a specific agent. Then an inert fluorescent tracer is added to the PVA or agent and the fluorometer is used to detect its fluorescent signal on the creping cylinder that the PVA or agent is placed in. If it is not possible to detect the fluorescent signal of the inert fluorescent tracer, due to background fluorescence, or interference from the fluorescent signal of the PVA or agent itself, then either more inert fluorescent tracer can be used, or an alternative inert fluorescent tracer can be selected for use with that agent or PVA. The alternative inert fluorescent tracer is selected such that its excitation and emission wavelengths are different than those of the background fluorescent signal(s) and the fluorescent signal of the agent. In at least one embodiment the fluorometers suitable for use in the instant claimed invention are capable of detecting and measuring the fluorescent signal (emission light) from the inert fluorescent tracer used.

In at least one embodiment the PVA is modified by reaction according to the following scheme:

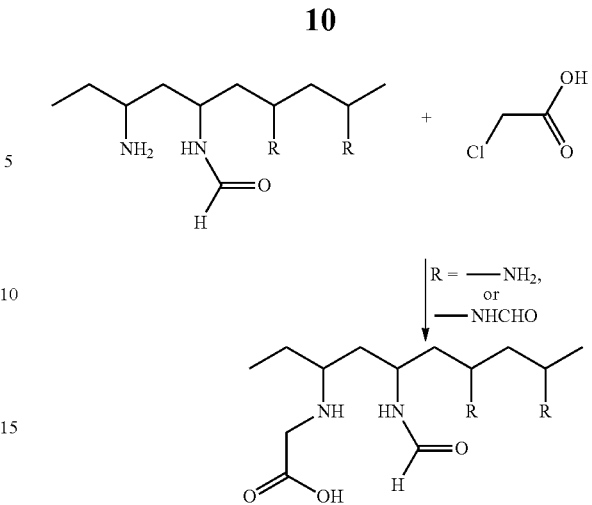

A halogenated organic acid modifies the polymer by reaction to covalently attach the carbonyl carbon of the acid to an amino nitrogen component of the polymer. In at least one embodiment the polymer has at least one of the structures described in U.S. Pat. No. 7,902,312. In at least one embodiment the polymer has the above structure and is formed by a reaction other than a Michael Addition or halogenated organic acid modification.

While halogenated organic acids have in the past been used with amine bearing polymers, (such as for example in U.S. Pat. No. 3,640,841), as the following reaction scheme demonstrates they have only involved adding a proton to a secondary amine group creating a cation, resulting in an ionic complex reaction. As a result the prior art only describes an ionic reaction not the inventive covalent one.

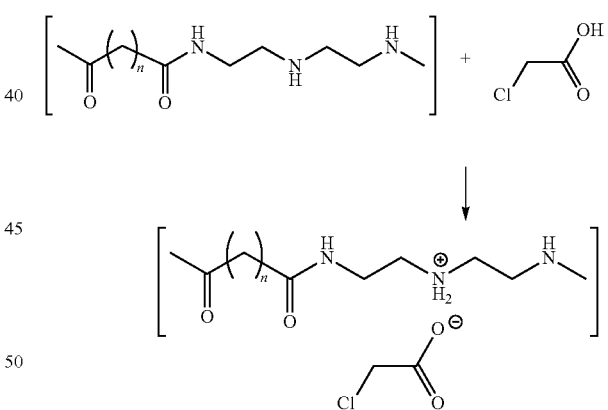

In an embodiment, one or more vinylamine/N-vinyl formamide polymers according to this invention and one or more polymers selected from the group consisting of polyaminoamides, polyalkylenepolyamines, poly(vinyl alcohol/vinylacetate), polyethylenimines and polyvinylamine copolymers in a ratio of about 5/95 to about 95/5 by weight are reacted with about 1 to about 10 percent, based on polymer actives, of one or more crosslinkers as described herein.

Polyaminoamides are generally made from the condensation polymerization of one or more organic dicarboxylic acid derivatives and one or more polyalkylene polyamines under conditions suitable for forming long-chain polyamides, preferably at temperatures higher than about 130° C. for several hours with removal of water or alcohol byproducts. The resulting polyaminoamide typically has a weight average molecular weight of about 500 to about 500,000 Daltons and a polymer Brookfield viscosity higher than about 100 cps for a 50% solution at 25° C. Water is added at end of the polymerization to make an aqueous polymer solution.

In at least one embodiment, a sufficient amount of organic acid derivative to react with substantially all of the primary amino groups but insufficient to react to any significant degree (or at all with) with the secondary amino groups of the polyalkylene polyamine is used. The organic dicarboxylic acid derivative/polyalkylene polyamine molar ratio is preferably between about 0.9/1.0 to about 1.0/0.9.

"Organic dicarboxylic acid derivatives" includes aliphatic and aromatic dicarboxylic acids and their corresponding acid chlorides, anhydrides and esters, and mixtures thereof. Esters are preferably $C_1$-$C_3$ aliphatic esters. The organic dicarboxylic acid derivatives are selected such that the resulting polyaminoamide is water soluble or water dispersible.

Representative organic dicarboxylic acids and their derivatives include maleic acid, succinic acid, glutaric acid, adipic acid, pimelic acid, suberic acid, azelaic acid, sebasic acid, phthalic acid, isophthalic acid, terephthalic acid, naphthalenedicarboxylic acid, dimethyl maleate, dimethyl malonate, diethyl malonate, dimethyl succinate, di-isopropyl succinate, dimethyl glutarate, diethyl glutarate, dimethyl adipate, methyl, ethyl adipate, dimethyl sebacate, dimethyl phthalate, dimethyl isophthalate, dimethyl terephthalate, dimethyl naphthalenedicarboxylate, dibasic esters (DBE), poly(ethylene glycol) bis(carboxymethyl)ether, succinyl chloride, glutaryl dichloride, adipoyl chloride, sebacoyl chloride, phthaloyl chloride, isophthaloyl chloride, terephthaloyl chloride, naphthalenedicarboxylate, maleic anhydride, succinic anhydride, glutaric anhydride, phthalic anhydride, 1,8-naphthaic anhydride, and the like. DBE-2 dibasic ester, adipic acid, dimethyl glutarate and dimethyl adipate are preferred.

Poly(vinyl alcohol/vinyl acetate) may be prepared by radical polymerization of vinyl acetate monomers as described in EP 0942008 and references cited therein followed be either acid or base hydrolysis as described in "Polyvinyl alcohol", ed. By C. A. Finch, John Wiley & Sons, New York, 1973, pp. 91-120. Poly(vinyl alcohol/vinyl acetate) is also commercially available, for example from Sekisui Specialty Chemicals, Dallas, Tex. under the tradename Celvol and from E.I. DuPont de Nemours & Company, Wilmington, Del. under the tradename Elvanol.

In all embodiment, the poly(vinyl alcohol/vinyl acetate) has a weight average molecular weight of about 13,000 to about 186,000 daltons and is composed of about 87-99.5 mole percent of vinyl alcohol units and about 13 to about 0.5 mole percent of vinyl acetate units.

In all embodiment, the poly(vinyl alcohol/vinyl acetate) has a weight average molecular weight of about 30,000 to about 60,000 daltons and is composed of about 87-89 mole percent of vinyl alcohol units and about 13 to about 11 mole percent of vinyl acetate units.

Polyvinylamine may be prepared by hydrolysis of poly(N-vinyl formamide) as described in U.S. Pat. No. 5,374,334 and references cited therein. Polyvinylamines useful for the method and compositions of this invention typically have a molecular weight of about 5,000 to about 500,000 Daltons. In an embodiment, the polyvinylamine has a weight average molecular weight of about 10,000 to about 100,000 Daltons.

Polyethyleneimines may be prepared by polymerization of ethyleneimine as described in U.S. Pat. Nos. 2,182,306 and 3,251,778. Polyethyleneimines are also commercially available, for example from BASF, Mount Olive, N.J. under the tradename Lupasol. Polyethyleneimines typically useful for the method and compositions of this invention have a weight average molecular weight of about 1,000 to about 1,000,000.

In an embodiment, the vinylamine/N-vinyl formamide polymers and/or cross-linked vinylamine/N-vinyl formamide polymers are modified by reaction with one or more halogenated organic acids of formula X—R—$CO_2$M where X is F, Cl, Br or I, R is alkyl or alkylaryl and M is H or an alkaline or alkaline earth metal or ammonium counterion including lithium, sodium, potassium, calcium, ammonium, and the like. Alkyl groups may be straight or branched and typically contain 1 to about 6 carbon atoms. Aryl groups are typically phenyl, optionally substituted with one or more halogen, alkyl, alkoxy or hydroxyl groups.

Representative halogenated organic acids include chloroacetic acid, 4-(chloromethyl)benzoic acid, 2-chloropropionic acid, 3-chloropropionic acid, bromoacetic acid, 2-bromobutyric acid, 3-bromobutyric acid, 4-bromobutyric acid, α-bromoisobutyric acid, and the like and their salts In an embodiment, the halogenated acid is chloroacetic acid or a salt thereof.

In an embodiment, the adhesive composition of this invention further comprises one or more water-soluble polyols.

As used herein, "polyols" refers to simple water-soluble polyols composed of alkylene groups and up to about six hydroxyl groups in which the alkylene groups are optionally interrupted by one or more O or NH groups. Representative water-soluble polyols include glycerol, ethylene glycol, 1,4-butanediol, diethanolamine, triethanolamine, sorbitol, diethylene glycol, triethylene glycol, propylene glycol, dipropylene glycol, polyethylene glycol, polyglycerols, and the like.

In an embodiment, the polylols are selected from glycerol, ethylene glycol, sorbitol, diethylene glycol, propylene glycol, polyethylene glycol and diethanolamine.

In at least one embodiment, the polyol is glycerol. In at least one embodiment at least one of the polyols is one or more selected from those polyols described in U.S. patent application Ser. No. 12/652,059 and/or in U.S. Pat. No. 8,101, 045, and any combination thereof.

The amount of water soluble polyols in relation to the vinylamine/N-vinyl formamide polymers on a dry polymer basis typically range from about 5 to 95 percent by weight. In an embodiment it is desirable to use between about 10-75 percent by weight of the water soluble polyol. It is to be understood that not all of the water soluble polyols produce similar results. In certain instances, depending upon the temperature employed, the particular the vinylamine/N-vinyl formamide polymers used and other variables, routine experimentation will be necessary to determine the optimum water soluble polyol to be used, as well as the particular amount to be employed in conjunction with the vinylamine/N-vinyl formamide polymers.

The adhesive compositions of the present invention are typically applied to the surface of a creping cylinder as a dilute aqueous solution. In an embodiment, the aqueous solution includes from about 0.01 to about 10.0 weight percent of the polymers of the invention. In another embodiment, the polymers of the invention are included in the aqueous solution in a concentration of from about 0.05 to about 5.0 weight percent. In another embodiment, the polymers of the invention are included in the aqueous solution in a concentration of from about 0.1 to about 1.0 weight percent. Those skilled in the art of creping adhesives will appreciate that the reason for such a larger percentage of water in the admixture is in part based on the need to only deposit a very thin layer of adhesive on the creping cylinder, which, in one embodiment, is most easily accomplished with a spray boom.

The spraying applications described above may be further improved by a variety of means, for example by using spraybooms designed for double or triple coverage, by oscillating the sprayboom and by recirculation of the diluted creping composition from the outlet of the sprayboom to improve mixing and reduce the possibility of separation.

In an embodiment, a release aid that is also in aqueous form is applied to the Yankee dryer along with the polymer adhesive. The release aid provides lubrication between the Yankee dryer surface and the doctor blade used to crepe the tissue paper from the Yankee dryer. The release aid also allows the tissue paper to release from the adhesive during the creping process. Representative release aids include release oils composed of naphthenic, paraffinic, vegetable, mineral or synthetic oil and emulsifying surfactants. In order to form stable aqueous dispersions the release aid is typically formulated with one or more surfactants such as fatty acids, alkoxylated alcohols, alkoxylated fatty acids, and the like. The release aid may be applied to the creping cylinder before or after the adhesive composition, or may be formulated with the adhesive for application to the creping cylinder.

The adhesive compositions of this invention may also be used in combination with functional additives used in the art to improve the softness of the tissue or towel. Representative functional additives include organic quaternary salts having fatty chains of about 12 to about 22 carbon atoms including dialkyl imidazolinium quaternary salts, dialkyl diamidoamine quaternary salts, monoalkyl trimethylammonium quaternary salts, dialkyl dimethylammonium quaternary salts, trialkyl monomethylammonium quaternary salts, ethoxylated quaternary salts, dialkyl and trialkyl ester quaternary salts, and the like. Additional suitable functional additives include polysiloxanes, quaternary silicones, organoreactive polysiloxanes, amino-functional polydimethylsiloxanes, and the like.

In an embodiment, the functional additives are formulated with the adhesive composition of this invention for application to the creping cylinder.

In an embodiment, the functional additives are selected from dialkylimidazolinium quaternary salts and quaternary silicones.

EXAMPLES

The foregoing may be better understood by reference to the following examples, which are presented for purposes of illustration and are not intended to limit the scope of the invention.

Experiments were conducted to blend polyvinyl alcohol with vinylamine/N-vinyl formamide polymers to produce stable and useful products for the tissue creping application. As a representative example, a solution was prepared containing 136.36 g of Polymer B (as identified in Table I of US Published Patent Application 2007/0000631) and 98.64 g of deionized water while mixing at 800-1000 rpm. With continued mixing, 15 g of dry (powder) Celvol 523 polyvinyl alcohol (available from Sekisui Specialty Chemicals) was added to the mixture. The mixture was heated to 90-95° C. and held at that temperature until the Celvol 523 was completely dissolved. The solution was cooled to room temperature, at which point, additional components can be added to the creping formulation. Additional components can include the water-soluble polyols described in claims 12-14 (US Published Patent Application 200710000631) other modifiers such as polyglycerol described in U.S. Pat. No. 8,101,045, preservatives, functional additives as described in [0049] of (US Published Patent Application 2007/0000631), and additional water for dilution.

Mixtures prepared in this fashion have proven to be extremely stable to separation issues. For example, a mixture of an aqueous solution of vinylamine/N-vinyl formamide polymer blended with an already dissolved and liquid PVOH (Celvol 523) phase separated within 2 days. When the blend is prepared according to the teachings of this invention by dissolving the dry PVOH into the aqueous solution of vinylamine/N-vinyl formamide polymers, the blend remains stable for over 9 months.

Furthermore, the blends of vinylamine/N-vinyl formamide polymers with PVOH prepared according to this invention show improved adhesion characteristics for the creping application. Peel adhesion was tested according to the method described in Example 6 US Published Patent Application 2007/0000631 with the moisture content of the cotton cloth controlled to simulate different sheet moistures from the TAD process. Higher normalized peel adhesion values represent improved adhesion. It can be seen in Table I that the blends of this invention provide consistently higher peel adhesion values compared with blending the two separate polymer solutions. In addition, adhesion is maintained to lower cloth moisture contents, which is an advantage for the TAD process, where sheet moistures when contacted with the Yankee are lower than in conventional creping processes.

TABLE I

| Cloth moisture (%) | Normalized peel adhesion | |
|---|---|---|
| | This invention | Celvol 523 prepared separately |
| 14 | 11 | |
| 24 | 17 | 4 |
| 31 | 23 | 2 |
| 47 | 26 | 4 |
| 59 | 55 | 41 |

Additional experiments were performed to evaluate blends of vinylamine/N-vinyl formamide polymers having different molecular weights and degrees of hydrolysis. Again the blends were evaluated to determine their effectiveness under the low moisture conditions prevalent in the creped TAD process. As identified in Table II, PVAm A has a weight average molecular weight ($M_W$) of 300 kD, as determined by SEC/MALLS, while PVAm B has a $M_W$ of 73 kD. Furthermore, PVAm A has a degree of hydrolysis of 30%, while PVAm B has a degree of hydrolysis of 70%. Note that the degree of hydrolysis indicates the number of vinylformamide groups in the polymer converted to vinylamine groups by hydrolysis.

The peel adhesion data provided in Table II shows how blends of vinylamine/N-vinyl formamide polymers having differing $M_W$ and degrees of hydrolysis can be used to maximize adhesion for different creping processes. For example, in TAD processes where the sheet moisture coming to the Yankee is low (see moisture content of 14% in Table II), blending of lower MW and higher degree of hydrolysis PVAm B with PVAm A increases the adhesion.

TABLE II

| Moisture (%) | PVAm A (%) | PVAm B (%) | Adhesion (g/in) |
|---|---|---|---|
| 14 | 100 | 0 | 51 |
| 14 | 75 | 25 | 117 |
| 14 | 50 | 50 | 182 |
| 14 | 0 | 100 | 296 |
| 31 | 100 | 0 | 520 |
| 31 | 75 | 25 | 461 |
| 31 | 50 | 50 | 475 |
| 31 | 0 | 100 | 428 |
| 59 | 100 | 0 | 309 |
| 59 | 75 | 25 | 200 |
| 59 | 50 | 50 | 308 |
| 59 | 0 | 100 | 160 |

While this invention may be embodied in many different forms, there described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments described herein and/or incorporated herein. In addition the invention encompasses any possible combination that also specifically excludes any one or some of the various embodiments described herein and/or incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range. All percentages, ratios and proportions herein are by weight unless otherwise specified.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method of creping a paper web comprising:
preparing an adhesive composition having a pH of between 6.5 and 8 and comprising two polymers, one of the two polymers is one or more vinylamine/N-vinyl formamide polymers comprising about 10 to about 99 mole percent vinylamine monomer and one of the two polymers is about 90 to about 1 mole percent N-vinyl formamide monomer, then reacting the two polymers with a halogenated organic acid at a temperature of between 90-95° C., such that the carboxyl carbon of the organic acid becomes covalently bonded to an amino nitrogen of the polymer,
allowing the solution to cool to below 80° C.
applying the adhesive composition to a to a creping cylinder,
pressing the paper web against the creping cylinder to effect adhesion of the paper web to the creping cylinder; and
dislodging the paper web from the creping cylinder with a doctor blade.

2. The method of claim 1 in which the pH of the composition is between 7 and 7.5.

3. The method of claim 1 in which the peel force adhesion of the polymer is at least 20% greater than that of the same polymer which has not been reacted with a substituted halogenated acid.

4. The method of claim 1 in which the composition further comprises at least one additional agent selected from the list consisting of: plasticizers, humectants, oxidative stabilizers, inorganic phosphates, organic phosphates, release agents, lubricants, corrosion control agents, and any combination thereof.

5. The method of claim 4 further comprising the steps of adding an inert fluorescent tracer to the composition and detecting florescence on the creping cylinder to determine the amount of polymer which actually attach to the cylinder.

6. The method of claim 1 in which at least one or the two polymers is crosslinked with another polymer selected from the list consisting of: polyvinyl alcohol, polyvinyl acetate, vinyl alcohol bearing polymers, vinyl acetate bearing polymers, polyaminoamides, polyamides, polyamines, crosslinked polyaminoamides, polyethyleneimines, polyacrylamide, glyoxylated polyacrylamide, polyacrylates, polymethylmethacrylates, starches, carboxymthylcellulose, polyethers, vinyl amine/acrylamide copolymers, vinylamine/acrylate copolymers, polyvinylpyrrolidones, synthetic proteins, natural proteins, and any combination thereof.

7. The method of claim 6 in which the cross linking is achieved with a crosslinking agent selected from the list consisting of epihalohydrins, dialdehydes diglycidyl ethers, and any combination thereof.

8. The method of claim 1 in which at least one of the two polymers is a copolymer that also contains the substituent units of another polymer selected from the list consisting of: polyvinyl alcohol, polyvinyl acetate, vinyl alcohol bearing polymers, vinyl acetate bearing polymers, polyaminoamides, polyamides, polyamines, crosslinked polyaminoamides, polyethyleneimines, polyacrylamide, glyoxylated polyacrylamide, polyacrylates, polymethylmethacrylates, starches, carboxymthylcellulose, polyethers, vinyl amine/acrylamide copolymers, vinylamine/acrylate copolymers, polyvinylpyrrolidones, synthetic proteins, natural proteins, and any combination thereof.

9. The method of claim 1 in which the paper web is pre-dried and passed along on a through air dryer belt before it is pressed against the cylinder.

10. The method of claim 1 in which the composition comprises a blend of two or more vinylamine/N-vinyl formamide polymers, at least one of the polymers being a low molecular weight polymer and at least one of the polymers being a high molecular weight polymer.

11. The method of claim 1 in which the composition comprises a blend of two or more vinylamine/N-vinyl formamide polymers, at least one of the polymers being a first polymer and having an $M_w$ of 2,000 to 2,000,000 and at least one of the polymers being a second polymer and having an $M_w$ of 1,000 to 200,000 and the $M_w$ of the first polymer being greater than the $M_w$ of the second polymer.

12. The method of claim 11 in which the form of the first polymer is either a liquid form polymer or a solid form polymer and the form second polymer is either a liquid form polymer or a solid form polymer and is a different form than that of the first polymer.

\* \* \* \* \*